Nov. 24, 1959     F. W. HAMMESFAHR ET AL     2,914,450
PROCESS FOR IRRADIATING FLAT STOCK ORGANIC POLYMERS
Filed Jan. 11, 1955
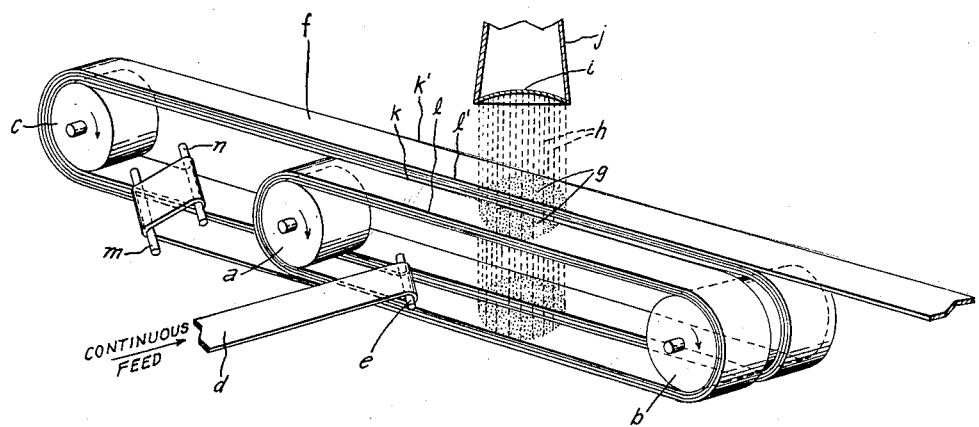
Inventors:
Robert L. Hatch,
Frederic W. Hammesfahr,
by
Their Attorney.

United States Patent Office 2,914,450
Patented Nov. 24, 1959

2,914,450

PROCESS FOR IRRADIATING FLAT STOCK ORGANIC POLYMERS

Frederic W. Hammesfahr and Robert L. Hatch, Pittsfield, Mass., assignors to General Electric Company, a corporation of New York Application January 11, 1955, Serial No. 481,151

5 Claims. (Cl. 204—154)

This invention is concerned with a process for irradiating an organic polymer with high energy radiation to improve the properties of the polymer. More particularly, the invention relates to a process for uniformly irradiating, preferably on a continuous basis, a flat stock organic polymer such as polyethylene, whose properties are subject to beneficial mutation by said irradiation, whereby a circular beam of high energy radiation, e.g., high energy electrons, can be used to irradiate the polymer in such a manner that uniform irradiation across the width of the flat stock is accomplished in an economical and expeditious manner.

In the copending application of Elliott J. Lawton and Arthur M. Bueche, Serial No. 324,552, filed December 6, 1952, and assigned to the same assignee as the present invention, there is disclosed and claimed a process for irradiating polyethylene with high energy electrons to improve the properties of the latter. By means of this irradiation, it is possible to render the polyethylene substantially infusible and insoluble at temperatures well above the temperatures at which the unirradiated material melts or softens. Such irradiation also improves other properties of the latter, as for instance, it reduces solubility of the polymer in various solvents in which the unirradiated material is ordinarily soluble.

According to the aforesaid Lawton and Bueche application, irradiation of the polyethylene is accomplished by passing a ply or layer of the polyethylene, for example, in sheet or tape form, continuously under and through a beam of high energy electrons at a velocity selected to give the desired irradiation dose. The source of these high energy electrons is usually from a cathode ray generator or electron accelerator apparatus, which commonly has a circular beam in which the center of the beam is of the greatest intensity and, as one travels to the outer periphery of the beam of electrons, the intensity of radiation decreases so that at the outer edge of the beam, the intensity is lowest. Because of this variation in intensity from one area of the electron beam to another, much of the energy of the beam would be wasted in the over-irradiation of the center of the object being irradiated, while the minimum edge dose is being acquired. One of the consequences of this type of irradiation has been that the products obtained thereby have been too expensive for general application. This practical and economic fact has limited and restricted the applications, on a commercial basis, of irradiation and of irradiated products, such as the organic polymers.

We have now discovered a means whereby the cost of irradiating organic polymers can be greatly reduced and the fields of application of both irradiation and of irradiated products greatly extended by avoiding the loss of valuable high energy radiation due to the wasteful over-radiation of certain areas while other areas are receiving the minimum acceptable dose. It is one consequence of our invention that the product quality will be improved because material processed in accordance with our invention will receive more uniform dosage despite variable radiation fields than has heretofore been economically possible. In accomplishing the above desired objective, we effect the irradiation of the organic polymer (which may be in the form of flat stock, such as sheet material, tape, lay-flat tubing, etc.) whose properties are desirably affected by irradiation with high energy radiation, by passing a film (which can be of varying thickness) under and through the electron beam twice at each ply depth of passage in such a manner that the first series of passes is made with the right edge of the film under the beam centerline, and the second series of passes being made with the left edge of the film under the beam centerline. The process is carried out so that one section of the film is receiving a second series of passes while another section is receiving its first series of passes. This method has been designated the "parallel band process."

By means of the dual passage whereby the position of the film passing under the beam is reversed, it is possible to obtain essentially uniform irradiation of the entire width and area of the film.

The accompanying drawing shows a single figure in perspective of a means for obtaining uniformity of irradiation from a circular beam pattern. More particularly, the single figure comprises rolls $a$, $b$, and $c$ moving in the direction of the arrows and transporting over their lateral surfaces a film of flat stock material such as polyethylene. The flat stock is fed in at point $d$ and manipulated around a turning bar $e$ to begin its passage over roll $a$. The surface $f$ of the flat stock passes under the circular beam pattern $g$ formed as a result of high energy radiation, such as high energy electrons $h$, issuing from exit window $i$ of a high energy radiation generating equipment such as a cathode ray tube $j$. As shown in the drawing, the inner edge $k$ of the flat stock passes through the center portion of the circular beam which has the highest radiation intensity, while the edge $l$ of the flat stock passes through the outer periphery of the beam of lower radiation intensity. In its further travel over roll $b$ the flat stock material is then manipulated over another turning bar $m$ and then over turning bar $n$ to continue its passage around roll $c$. It then again enters the circular beam pattern but this time the edge $k'$ which in its initial passage (as $k$) though the beam pattern was under the axis of the beam of highest intensity now passes through the outer periphery of the beam pattern of lower intensity while the edge $l'$ of the flat stock material now passes through the central axis of the beam of highest intensity whereas in its initial pass through the beam (as edge $l$) was passing through the portion of the beam of lower intensity. After this second passage through the beam, the flat stock material may be removed in the direction shown by the arrow. Instead of making one pass around rolls $a$, $b$ and $c$, the flat stock may pass a plurality of times around these rolls accumulating during each passage through the zone of high energy radiation an incremental dose of radiation so that when it finally leaves the zone of radiation, each section of the flat stock material will have accumulated the desired radiation dose.

In order to achieve maximum efficiency of the cathode ray beam when employing this particular process, it is essential that the proper film width be used for the distance from the tube to the film at which the irradiation is to be carried out, or conversely that the optimum window-to-film distance be employed for the width of the film to be irradiated. The method for determining the optimum film width at a given window distance is as follows:

Several film widths are selected for evaluation purposes. The relative cumulative exposure that a given point on a film of given width will receive in the first and second passages is calculated and the two values added together, This procedure is repeated for points at one inch increments across the given film width. The given film width is then multiplied by the minimum cumulative exposure occurring across the width. The mathematical products so obtained are compared for the several widths being tested. The width giving the maximum mathematical product is optimum to the particular window-to-film distance being employed.

To enable persons skilled in the art to more clearly understand the method for calculating optimum conditions in each instance of irradiation, the following is an example in which 10″ wide polyethylene tape of about 5 mil thickness was irradiated by passing it under a cathode ray generator window, 20 centimeters from the window and subjecting the polyethylene to a dose of $7.5 \times 10^6$ R. In accordance with this procedure more particularly illustrated by the single figure in the accompanying drawing, the tape first completes its unwind on one side, then returns to make a second unwind on the other side with the edge previously at the center of the beam now at the outside edge of the beam. As the polyethylene works its way over the rolls, it comes under, and is penetrated by the high energy electrons issuing from the end window of the cathode ray generator tube. During the entire time that a given section of film is working its way to the surface, it will be noted that the beam pattern is allowed to impinge in such a manner that one edge passes under the area of highest intensity portion of the beam while the other edge passes under the area of lowest intensity portion of the beam, with the remainder of the width of the film being subjected to intermediate intensities. As the polyethylene film continues its travel, the intensity of radiation impingement is reversed. Thus, what was initially the edge of the polyethylene film under the center of the beam receiving the highest intensity of irradiation, that edge of the polyethylene film is now farthest from the center of the electron beam pattern, and the edge of the film which received the least dose in its passage originally through the beam is now receiving the maximum dose. By means of the film first working its way to the surface with its right edge passing under the beam center line and then repeating the whole procedure with its left edge under the beam center line, it is possible to build up a uniform cumulative dosage from side to side of the film in spite of the non-uniform circular beam pattern.

This parallel band embodiment results in benefits which are substantial. For example, when a 10″ wide film makes only one series of passes with its center under the beam center line, at a distance of 20 centimeters from the window, in a manner which eliminates inefficiency due to penetration using the multi-ply method of irradiation described in Lawton application Serial No. 481,152, filed concurrently herewith and assigned to the assignee of the present invention, the center line of the film receives over twice the cumulative exposure that the edges of the film receive and the beam is utilized with only about 38 percent efficiency. By utilizing two passes in accordance with our method, the difference in exposure between the edge and center line is reduced to 16 percent and the efficiency of beam utilization is raised to about 76 percent. It might be supposed that irradiating the single 10″ width at a shorter distance from the window would increase the efficiency. However, because of the beam characteristics, this is not the case. The same distance is optimum both for the parallel bands of our process and for the single band system described in the above-mentioned Lawton application Serial No. 481,152. The following Table I illustrates, for various distances across the tape, the uniformity of irradiation obtained as a result of irradiating 10″ tape, 20 centimeters below the cathode tube window while the above described parallel band embodiment is employed. The designations of the letters in the table are as follows:

$y$ = distance in inches from beam center line in the plane of the tape perpendicular to direction of the tape motion
$D$ = cumulative dosage in roentgens (designated as "R")
$V$ = the lineal velocity of the tape in feet per minute
$t$ = the thickness per ply of the polyethylene in mils The values ($DVt$) represent the mathematical product of dosage, lineal speed, and film thickness existing at the indicated points across the width of the film. The relative constancy of the values in the "Total" column indicates that for a given film speed and thickness, dosage D is remarkably constant in spite of the non-uniform beam pattern.

Table I

| Distance in Inches Across Tape, Left to Right | $y$, Inches | | $(DVt) \times 10^{-6}$ | | Total |
|---|---|---|---|---|---|
| | 1st Unwind | 2nd Unwind | 1st Unwind | 2nd Unwind | |
| 0 | 0 | 10 | 556 | 72 | 628 |
| 1 | 1 | 9 | 510 | 93 | 603 |
| 2 | 2 | 8 | 455 | 122 | 577 |
| 3 | 3 | 7 | 397 | 160 | 557 |
| 4 | 4 | 6 | 336 | 210 | 546 |
| 5 | 5 | 5 | 271 | 271 | 1 542 |
| 6 | 6 | 4 | 210 | 336 | 546 |
| 7 | 7 | 3 | 160 | 397 | 557 |
| 8 | 8 | 2 | 122 | 455 | 577 |
| 9 | 9 | 1 | 93 | 510 | 603 |
| 10 | 10 | 0 | 72 | 556 | 628 |

[1] Minimum value.

If a minimum dosage (D) of $7.5 \times 10^6$ roentgens is desired, with 10 mil film, a lineal speed of 7.2 feet per minute would be used.

In the description above, the term "ply" or "plies" is intended to mean a layer or layers of flat stock material of organic polymers of essentially uniform thickness and includes flat sheets, tapes, film, flattened tubing, U-shaped tubing (wherein the sheet or film or tape is half-curved to give a U-shaped body in which the straight members of the U are parallel and passing under the high energy radiation beam), etc.

The term "organic polymers" is intended to include solid organic compositions capable of being utilized in flat stock form and which are capable of being irradiated with various sources of high energies, for instance, high energy electrons, in order to modify the properties of the organic polymer in an advantageous and desirable manner. Among such polymers may be mentioned, for instance, polyethylene, chlorinated polyethylene, chlorosulfonated polyethylene, polyamide resins, various natural and synthetic rubbers including copolymers of butadiene and styrene, copolymers of butadiene and acrylonitrile, silicone rubbers, i.e., organopolysiloxanes convertible to the cured, solid, elastic state by treatment with high energy radiation, polyacrylonitrile materials, polyethylene terephthalate polymers (such as those sold under the name of "Mylar"), etc. Many of these polymers are described in the copending applications of Lawton and Bueche, Serial Nos. 324,552; 324,554, and 324,555, filed December 6, 1952, as well as in Lewis and Lawton application, Serial No. 291,542, filed June 3, 1952, now U.S. Patent 2,763,609, all the applications being assigned to the same assignee as the present invention.

The term "beam" as employed in the present specification and claims is intended to mean a stream of high energy radiation (such as high energy electrons supplied by a cathode ray generator) which can effect the desirable mutation of the organic polymer in the passage of the latter through the zone of radiation.

The source of high energy radiation employed in carrying out our invention may also be varied widely. Thus, one can use as the source of high energy radiation a cathode ray generator having the above-described circular symmetrical pattern. One could also alternatively employ other forms of radiation yielding circular symmetrical patterns, as, for instance, those derived from X-ray generators, radioactive materials such as cobalt 60 source of gamma radiation, etc. In general, although one can use alpha, beta, gamma, or even neutron radiation, we prefer to employ high energy electrons or cathode ray radiation.

The more available and presently more practical and economic source of high energy radiation displaying a circular beam pattern is found in the high energy electrons generated by high voltage apparatus which is more particularly described in U.S. Patent 2,144,518 of Willem F. Westendorp, issued January 17, 1939, and assigned to the assignee of the present invention. In general, this apparatus comprises a resonant system having an open, magnetic circuit inductance coil which is positioned within a tank and energized by a source of alternating voltage to generate the high voltage across its extremities. At the upper end of a sealed-off evacuated tubular envelope is located a source of electrons which is maintained at the potential of the upper extremity of the inductance coil, whereby a pulse of electrons is accelerated down the envelope once during each cycle of the energizing voltage, when the upper extremity of the inductance coil is at a negative potential with respect to the lower end. Further details of the construction and operation of high voltage apparatus of this type may be found in the aforementioned Westendorp patent, and also in Electronics, vol. 16, pages 128-133 (1944).

The above-described high voltage apparatus is also described in the aforementioned Lawton and Bueche application, Serial No. 324,552. The above apparatus is provided with an elongated metal tube, which extends below a hermetically sealed tank. The lower portion of the tube is generally conical in cross section to permit an increased angular spread of the electron beam. The emergence of high energy electrons from the tube is facilitated by an end window which is preferably hermetically sealed to the tube. The end window should be thin enough to permit electrons of desired energy to pass therethrough, but thick enough to withstand the force of atmospheric pressure. Stainless steel of about 0.002 inch thickness has been found satisfactory for use with electron energies of about 230,000 electron volts or greater. By forming the end window in arcuate shape, greater strength for resisting the force of atmospheric pressure may be obtained for a given window thickness. The desired focusing of the accelerator electrons may be secured by a magnetic field generating winding energized by a source of direct current through a variable resistor.

It will be apparent that by means of our invention it is possible to equalize the dose accumulation in the entire width and area of the organic film being irradiated, even though one is employing a circular beam pattern, which, even though symmetrical about the tube axis, decreases in intensity as one proceeds from the center radially to the outer periphery. For the generator employed in the description of the invention above, the relative intensity of radiation falling on a plane surface parallel to the cathode ray tube window and separated from the window by 20 centimeters of air, varies as follows with the stated radial distance from the tube axis:

*Table II*

| Radial Distance from Tube Axis, Inches | Approximate Relative Intensity of Irradiation |
| --- | --- |
| 0 | 1.000 |
| 2 | 0.905 |
| 4 | 0.673 |
| 6 | 0.292 |
| 8 | 0.115 |
| 10 | 0.088 |
| 12 | 0.023 |

At planes nearer the window, the total spread of the beam becomes smaller and the gradient of intensity becomes correspondingly sharper. Heretofore, when film wide enough to intercept the entire beam has been irradiated until its outside edge has received the desired degree of radiation, the center of the film has been wastefully over-irradiated. By employing our invention in combination with the circular beam, we eliminate the inefficiency caused by the non-uniform circular pattern typical of many such beams.

Various modifications of the above physical form of the organic polymer obviously can be employed without departing from the scope of the invention. Wherever single-ply is referred to, it could be replaced by several plies handled together as a laminate, such as "lay-flat" tubing of either single film or lay-flat tubing folded upon itself once or several times.

The use of the above-described process for obtaining uniform radiation from a circular beam pattern which, by itself gives non-uniform radiation, can be combined with the multi-ply treatment described and claimed in the copending application of Elliott J. Lawton, Serial No. 481,152, filed concurrently herewith and assigned to the same assignee as the present invention, which application, by reference, is made part of the disclosures of the present application. In accordance with this invention, the penetrating characteristics of the high energy radiation through the organic polymer in the passage of the latter through the beam of high energy radiation can be employed in an economical and efficient manner by utilizing a multi-ply treatment by passing a plurality, for example, at least two or more superposed layers or plies of an organic polymer simultaneously through the radiation beam, while the desired dose level is being accumulated in each section of the polymer.

Obviously, other polymers in addition to the polyethylene described above, many examples of which have been given previously, together with different levels of radiation energy, may be employed in the practice of the present invention. The use of our method for uniform radiation over the width and length of an organic polymeric flat-stock material can be in such a manner that the outer edge of the circular beam pattern overlaps the edge of the polymeric film which is farthest from the center of the beam, so that a more intense radiation is obtained at the outer edges of the film than would be obtained if the outer edge of the film were to coincide with the absolute outer periphery of the circular beam.

What we claim as new and desire to secure by Letters Patent of the United States is:

1. The process for irradiating a flat stock organic polymer with a circular beam of high energy radiation composed of high energy electrons in order to utilize more efficiently the aforesaid radiation and to obtain a more uniform radiation pattern throughout the width of the polymer being passed underneath the beam of high energy radiation, which process comprises passing the flat stock polymer through the center of the radiation beam so that the center portion of the radiation beam impinges on one edge of the flat stock while the portion of the radiation beam of lower intensity radiates outwardly toward the other edge of the flat stock, and thereafter re-introducing the flat stock into the high energy radiation beam so that the edge of the flat stock which received the higher radiation intensity due to being subjected to the more intense portion of the beam, is now subjected to the portion of the beam of lower intensity while the edge of the flat stock which initially received the lower intensity radiation is in turn subjected to the higher intensity radiation from the high energy radiation beam.

2. The process as in claim 1 in which the organic polymer is polyethylene.

3. The process as in claim 1 in which the organic polymer is chlorinated polyethylene.

4. The process as in claim 1 in which the organic polymer is an organopolysiloxane convertible to the cured, solid, elastic state.

5. The process for irradiating flat stock polyethylene with high energy electrons in order to utilize more efficiently the aforesaid radiation and to obtain a more uniform radiation pattern throughout the width of the polyethylene being passed continuously underneath the beam of high energy electrons, which process comprises (1) continuously passing a plurality of superposed layers of the polyethylene simultaneously under the electron beam, there being employed a number of superposed layers of the polyethylene sufficient to prevent at most only a negligible quantity of electrons from penetrating through the layer farthest from the source of high energy electrons, the center portion of the electron beam impinging on one edge of the polyethylene flat stock while the portion of the electron beam of lower intensity radiates outwardly towards the other edge of the polyethylene flat stock, and (2) thereafter reintroducing the continuously moving polyethylene flat stock into the electron beam so that the edge of the flat stock which received the higher intensity of electrons due to being subjected to the more intense portion of the beam, is in turn subjected to the portion of the electron beam of lower intensity and the edge of the polyethylene flat stock which received the lower intensity radiation is in turn subjected to the higher intensity radiation from the electron beam.

References Cited in the file of this patent

UNITED STATES PATENTS

| | | |
|---|---|---|
| 2,602,751 | Robinson | July 8, 1952 |
| 2,763,609 | Lewis et al. | Sept. 18, 1956 |

OTHER REFERENCES

Foster et al.: "Nucleonics," pp. 14–17, October 1953.

Ind. and Eng. Chemistry, vol. 45, September 1953, pp. 11A, 13A.

Ellis: "Synthetic Resins," vol. 1, pages 164–167 (1935).

Charlesby I: "Proc. Royal. Soc. London," vol. 215, pages 187–212 (November-December 1952).

Charlesby II: "Nucleonics," vol. 12, pages 18–25 (June 1954).